Dec. 24, 1963 L. J. SCHILLING ETAL 3,115,116
MILKER
Filed Jan. 15, 1962 7 Sheets-Sheet 5

Dec. 24, 1963   L. J. SCHILLING ETAL   3,115,116
MILKER

Filed Jan. 15, 1962   7 Sheets-Sheet 7

United States Patent Office 3,115,116
Patented Dec. 24, 1963

3,115,116
MILKER
Lorell John Schilling and Orville Oanes, Galesville, Wis., assignors to Schilling Electric Company, a corporation of Wisconsin
Filed Jan. 15, 1962, Ser. No. 166,129
28 Claims. (Cl. 119—14.08)

This invention relates to a mechanical milker and more particularly to a mechanical milker incorporating an automatic stripping action and an automatic shutoff of the milking operation as the animal is milked out.

Present day mechanical milkers utilize a double-action milking operation in which a continuous vacuum is applied to the end of the animal's teats and the teat is alternately massaged and released. This operation is provided by a teat cup unit including a rigid outer shell and a flexible liner or inflation which is applied to the teat. A continuous vacuum inside the inflation allows the milk to flow from the teat and through the inflation into further milk handling apparatus as a bucket or milk line. The space between the inflation and the shell is alternately evacuated, expanding the inflation, releasing the teat, and opened to air, collapsing the inflation about the teat, providing rest and massage. Even with milkers which apply a downward and forward tug and pull to the cow's teats, sometimes all the milk is not withdrawn. A good dairyman will hand strip a cow after the machine is removed, to get all the milk. Furthermore, if the milker is left on the cow after all of the milk has been withdrawn from the udder, the continued application of vacuum irritates the tissues of the teat and may cause infection and permanent damage. This problem is further complicated by the fact that the four quarters of the cow normally do not require the same period of time to milk out so that the milking operation should be stopped and the teat cup removed from each quarter at a different time. Where one man is handling three and sometimes more milker units, it is difficult for him to watch each unit closely enough to determine when each teat cup should be removed.

Many efforts have been made to provide a milker which shuts off automatically on the cessation of flow of milk. Many of these milkers have incorporated float valves of one type or another which seat when the milk flow drops below a minimum value, shutting off vacuum to the interior of the inflation. If air is admitted to the interior of the inflation, the teat cup will fall from the teat under its own weight. This is generally undesirable for sanitary reasons and because it requires a greater capacity in the vacuum system. In addition, the mechanism in the milk flow passage, including the float and valve member and float chamber, for example, greatly complicates the sanitary problems of the dairyman. These devices cannot readily be disassembled and the parts thoroughly washed, nor will they wash in a satisfactory manner by circulating the washing solution through them as is presently done with much milking equipment. Accordingly, the advantages achieved by virtue of the automatic shutoff are outweighed by the problems of the mechanism, and automatic shutoff milkers have not met with a great deal of commercial success.

A principal object of this invention is to provide an improved milker with which an additional pull is automatically applied to the animal's teats when the milk flow is reduced, providing an automatic stripping action, and with which the sanitary problems of prior automatic shutoff mechanisms are eliminated.

One feature of the invention is the provision in a milker with milk withdrawing means including a teat cup assembly connectable with an animal's teat and including a milk flow passage, means sensing a flow of milk through the passage, and means operably associated with the assembly and responsive to the sensing means for applying an increased downward pull to the milk withdrawing means when there is a predetermined flow condition of milk in the passage.

Another feature of the invention is the provision of such a milker in which means are provided for removing the milk withdrawing means when there is a substantial cessation of the milk flow in the passage.

A further feature of the invention is the provision of such a milker in which the milk flow is sensed electrically.

Still another feature is the provision of means including a piston and cylinder device for applying a pull to the teat cup assembly. In accordance with the invention, a vacuum system is utilized for actuating the piston and cylinder device and a valve is opened upon substantial cessation of flow of milk through the passage, connecting the vacuum source with the cylinder through a restricted vacuum passage.

Yet a further feature of the invention is the provision in a milker, of milk withdrawing means including a teat cup assembly connectable with an animal's teats and including a milk flow passage, means defining a milk receiving chamber connected with the milk flow passage of the assembly, a cylinder mounted on the chamber, a piston movable in the cylinder and having a portion operably engaged with the teat cup assembly, means sensing a flow of milk through the passage and means responsive to the sensing means for actuating the piston to apply a pull to the assembly. Preferably, this arrangement is duplicated with one piston and cylinder for each of the four teat cups of a milker unit, and a separate sensing means in the milk passage associated with each teat cup, the individual pistons being actuated in accordance with the milk flow through the associated passage.

Still another feature of the invention is the provision of an inflation with a stem defining a milk flow passage, having electrical sensing means for determining the condition of milk flow through the passage including an electrode extending into the passage. And a further feature of the invention is the provision of such an inflation in which the passage through the stem of the inflation is channel shaped with the electrode extending across the wider dimension of the channel to a point adjacent the opposite wall.

Further features and advantages of the invention will be readily apparent from the following specification and from the drawings, in which.

The invention as disclosed herein is incorporated in a parlor stall, carry-away milking system, i.e., one in which the milk flows directly into a milk line through which it is conducted to a bulk holding tank or the like. It is to be understood that the invention could also be used as a part of a stanchion carry-away system or with a suspended bucket milker.

Figure 1:
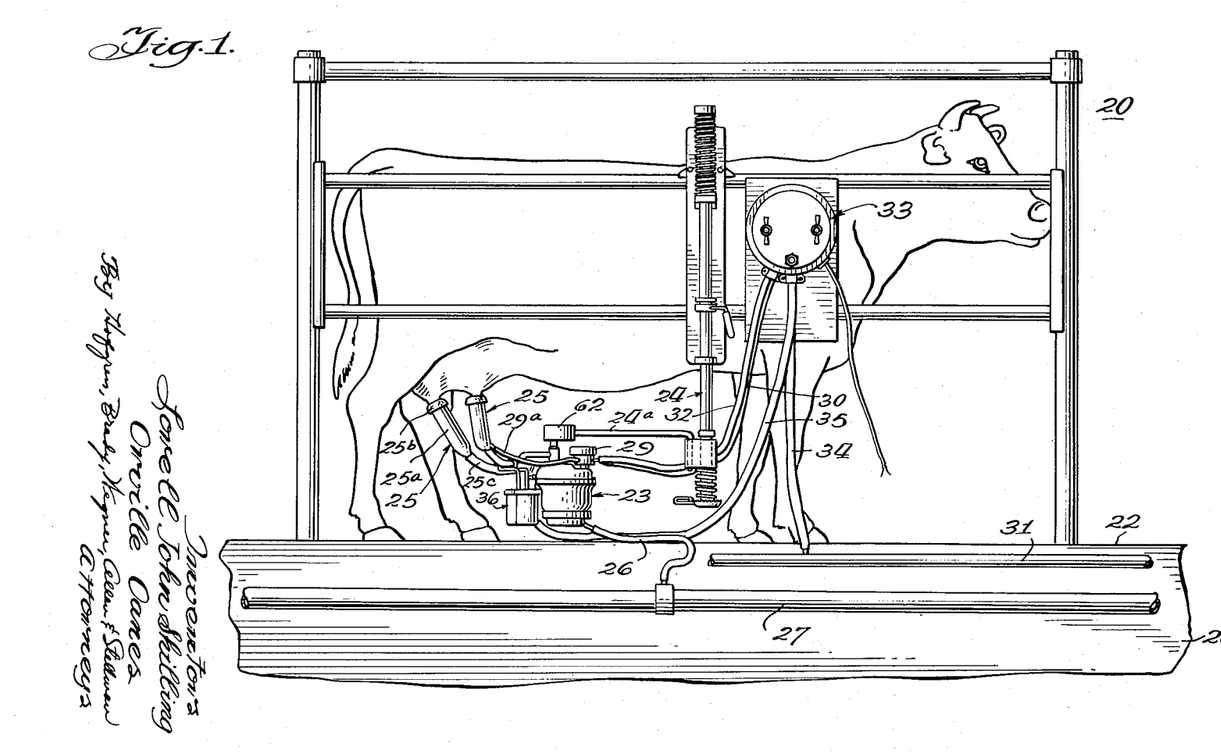
FIGURE 1 is an elevation of a milker stall showing an apparatus embodying the invention, in use on a cow.

Turning now to FIGURE 1 of the drawings, an elevated parlor stall 20 is shown in which the cow stands on a floor 22 above the operator's alley (not shown). The milker apparatus indicated generally at 23 is carried beneath the cow on an arm 24a of a supporting apparatus 24, of the type shown in Babson application, Serial No. 733,676, filed May 7, 1958, now Patent No. 3,033,161. The milker 23 includes a teat cup assembly comprising four teat cup units 25, each of which includes a rigid outer shell 25a and a flexible inner liner or inflation 25b which has a stem portion 25c defining a milk passage and connected with a nipple on the cover of milker 23. A milk hose 26 is connected from the bottom of milker 23 to an evacuated milk line 27, here shown as extending along the wall 28 below the level of the cow floor 22. A pulsator valve 29 mounted on top of the milker 23 is connected through hoses 30 and 32 with control unit 33 which is carried on stall 20 and is connected with vacuum line 31 by a hose 34. The pulsator is operated by vacuum control signals through hose 32 providing alternative vacuum (from hose 30) and air to the shells 25 through hoses 29a. Under control the pulsator, inflations 25b expand and collapse providing the alternate milking and rest periods.

A multiple passage control hose 35 connects the control unit 33 with the piston and cylinder assembly 36 carried on the milker. As will appear, a separate piston and cylinder is provided for each of the teat cup units, the piston being connected with the associated teat cup. A sensing means detects a substantial cessation of flow of milk through the teat cup and causes the control unit to connect the appropriate cylinder to the vacuum line, urging the piston downwardly, applying a downward pull to the cup. If the quarter of the cow is not completely milked out, this downward pull has the effect of straightening out the milk passages in the udder facilitating the withdrawal of all of the milk from the quarter. Upon removal of all the milk which can be obtained, the downward force physically pulls the teat cup unit from the teat.

Figure 2:
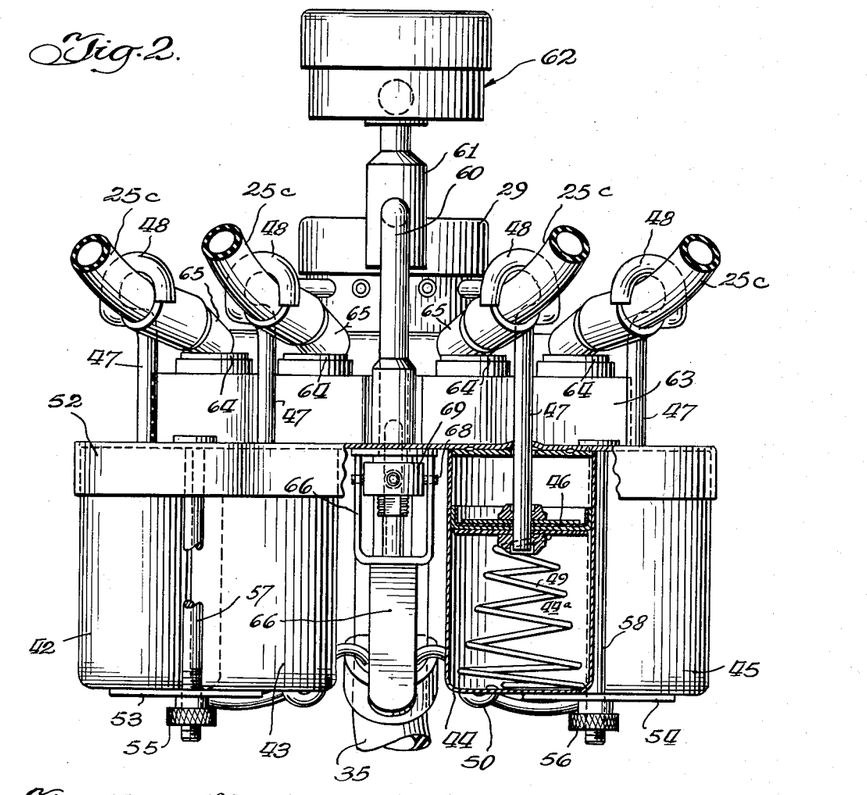
FIGURE 2 is a fragmentary elevation, partially in section of the milker looking from the left in FIGURE 1.
Figures 3, 5, 5A, 6:
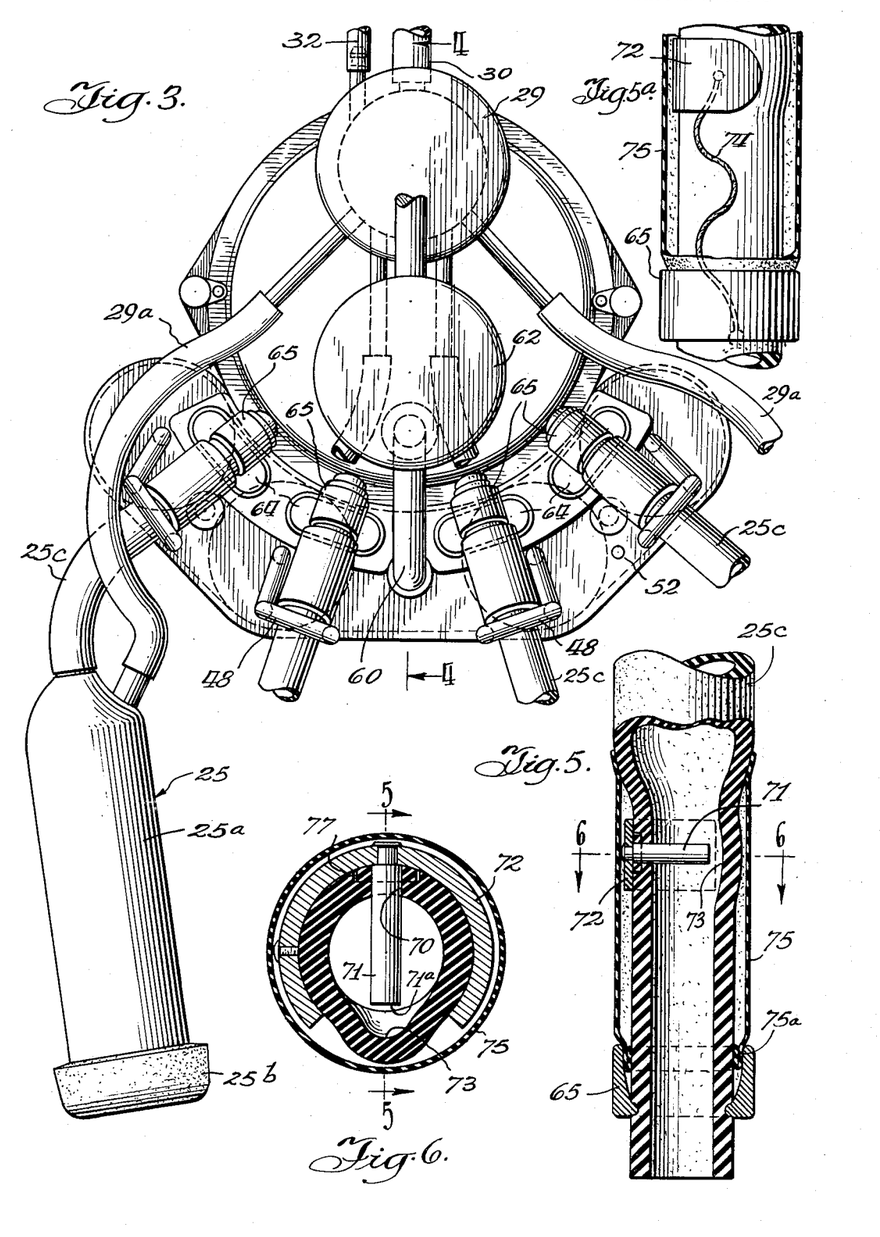
FIGURE 3 is a plan view of the milker of FIGURE 1.
FIGURE 5 is a fragmentary view, partially in section, taken longitudinally through the end of the stem of an inflation.
FIGURE 5a is a fragmentary view of the end of the stem of an inflation, partially in section, showing a portion of the electrical circuit.
FIGURE 6 is a sectional view taken along line 6—6 of FIGURE 5.
Figure 4:
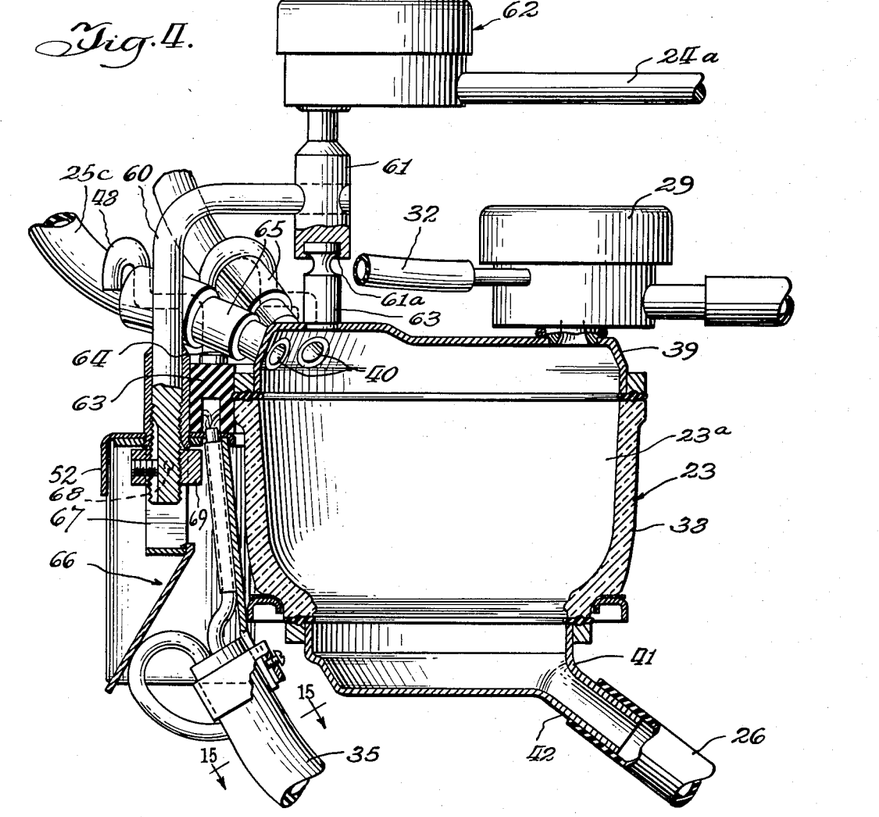
FIGURE 4 is a vertical section taken generally along line 4—4 of FIGURE 3.
Figure 7:
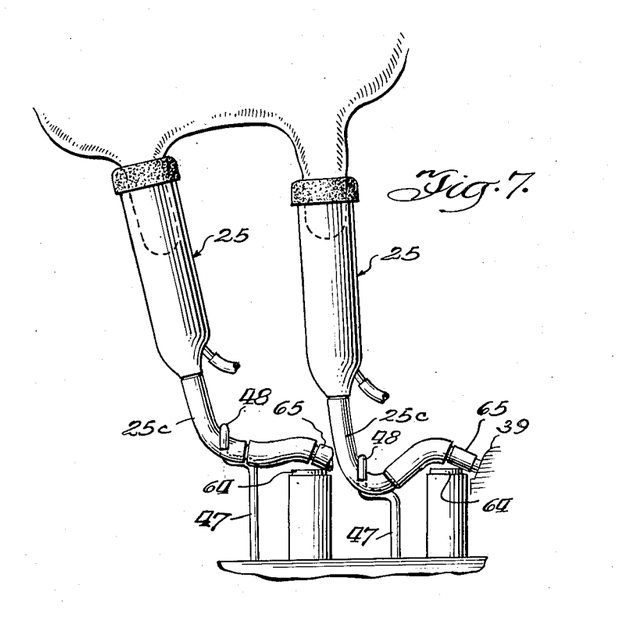
FIGURE 7 is a fragmentary elevation illustrating the operation of the milker.
Figure 8:
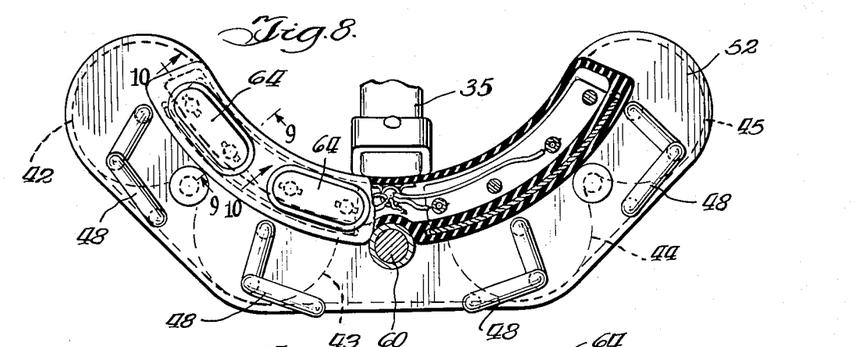
FIGURE 8 is a plan view, partially broken away, of the piston and cylinder mechanism.
Figure 9:
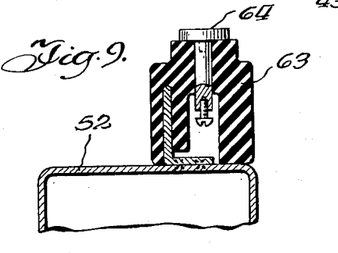
FIGURE 9 is a fragmentary section taken generally along line 9—9 of FIGURE 8.
Figure 10:
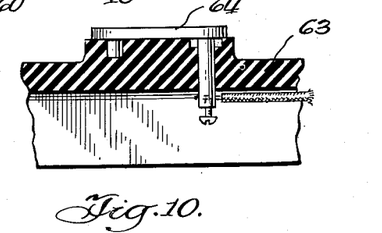
FIGURE 10 is a fragmentary section taken generally along line 10—10 of FIGURE 8.
Figure 11:
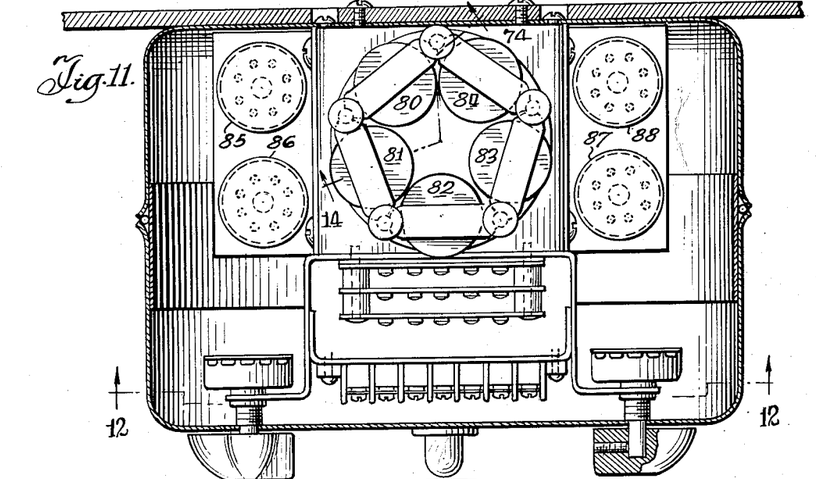
FIGURE 11 is a plan view of the control unit taken generally along the line 11—11 of FIGURE 12.
Figure 12:
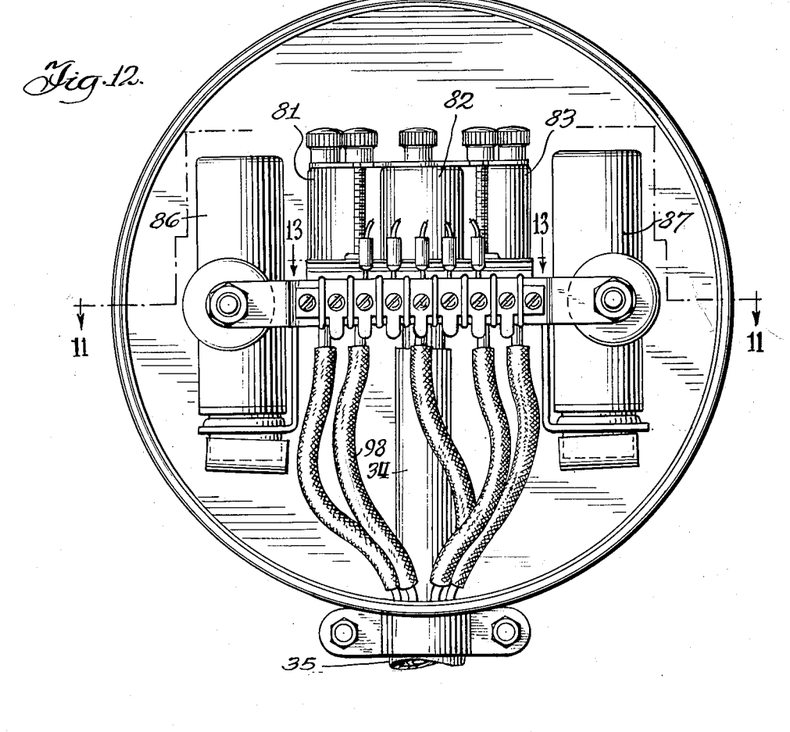
FIGURE 12 is an elevational view of the control unit taken generally along line 12—12 of FIGURE 11.
Figure 13:
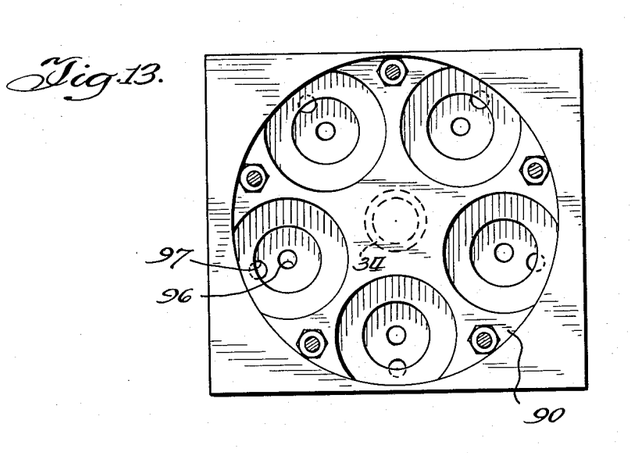
FIGURE 13 is a sectional view through the vacuum control valve mounting taken generally along line 13—13 of FIGURE 12.
Figure 14:
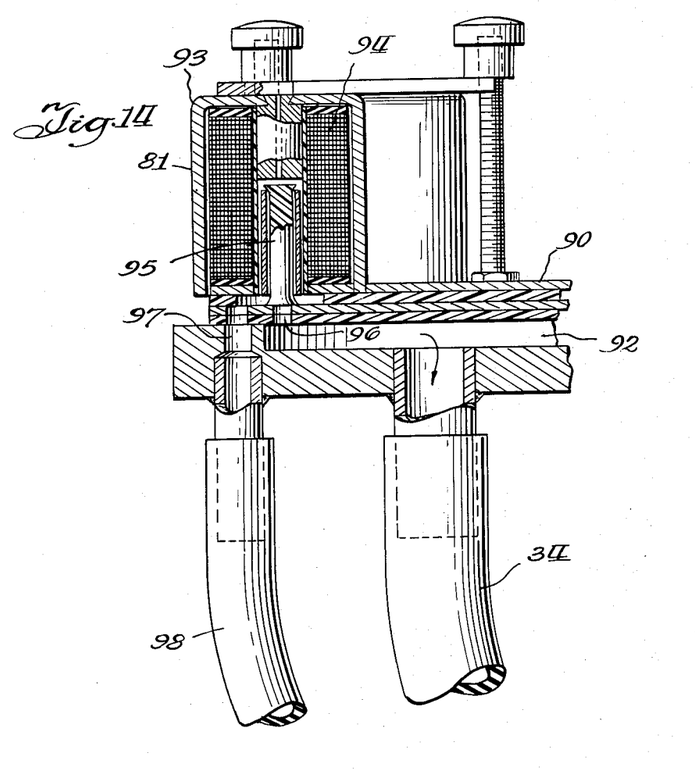
FIGURE 14 is a sectional view through a vacuum control valve taken generally along line 14—14 of FIGURE 11.

Referring more particularly to FIGURES 2, 3 and 4, the milker 23 includes an enlarged chamber 23a in the milk line immediately adjacent the teat cups 25, in accordance with the teachings of Thomas Patent 2,709,116. The specific structure shown in the drawing is the subject of Merritt et al. Patents 2,831,456 and 2,869,512. Chamber 23a is formed by a bowl 38, preferably of a transparent material so that the progress of the milking may be observed, which is closed at the top by a lid 39 with nipples 40 to which the milk tubes 25 of the teat cup units are attached, and a base 41 having a single nipple 42 to which the evacuated milk hose 26 is attached. As pointed out in the aforementioned Thomas patent, the chamber 23a provides for a break or separation in the column of milk flowing from the teat cup units 25 to the milk hose 26. As the milk flows from the inflation into the chamber 23a, it falls to the bottom of the chamber, separating from nipples 40 so that an air space remains above the level of milk in the chamber. The parts associated with the inflations are not flooded with milk and the inflation action both in opening and in closing, is snappy.

The piston and cylinder assembly 36 includes four cylinders 42, 43, 44 and 45, numbered from the left in FIGURE 2. The cylinders are generally similar and only one will be described in detail. Cylinder 44, which is shown in section in FIGURE 2, is a cup of a suitable material, as stainless steel, and has slidable therein a piston 46 to which is affixed a rod 47, the upper end of which has an offset hook configuration 48, engaged over the top of the stem of the inflation with which the cylinder is associated. A spring 49 in cylinder 44 urges a piston 46 to a raised position in which the hook 48 lies loosely over the top of the inflation stem 25c, and does not have a binding effect. The hook 48 is offset from piston rod 47 and the piston is freely rotatable, so that the hook does not tend to bind or limit the movement of the teat cup unit.

The lower portion of cylinder 44 is connected through a tube 50 with a vacuum control valve, which will be described below. When the lower chamber 44a of cylinder 44 is evacuated, piston 46 is urged downwardly by the air pressure above it drawing the hook portion 48 of piston stem 47 down against the inflation stem 25c. A pull is applied to the teat cup unit 25, which if continued will pull the unit from the animal. The operation of vacuum valve in admitting vacuum to the chamber of cylinder 44 is controlled in response to the flow of milk from the animal, as will appear. Spring 49 has a retarding effect and the passage between the vacuum source and the cylinder is restricted, both providing means limiting the rate at which the piston is drawn down. If the piston were drawn down too rapidly, the teat cup would be pulled off without time for the automatic stripping action to take place.

The cylinders 42, 43, 44 and 45 are carried beneath a cylinder cover plate 52 by clamp plates 53 and 54 held in place by nuts 55 and 56 secured to tie rods 57 and 58. Plate 52 is slidably mounted on a rod 60 extending outwardly and downwardly from the socket member 61 which depends from an adjustable ball and socket connector 62 at the end of support rod 24a. Socket 61 has a recess 61a in the undersurface thereof which receives the top of a stud 63 on the lid 39 of the milker. A block 63 of insulating material is mounted on top of cover plate 52 and has electrical contact portions 64 wedged upwardly into contact with conductive rings 65 on the ends of the inflations, and forming a portion of the milker control circuit, as will appear. A locking lever 66 has a U-shaped portion 67 pivotally mounted at 68 to an adjusting nut 69 threaded on the lower end of rod 60. In the position shown in the drawing, the locking lever urges the cylinder assembly and block 63 upwardly against the ends of the inflation stems forcing the entire milker chamber 23a upwardly urging the post 63 into the recess 61a. The assembly may be taken apart by pulling the locking lever 66 forwardly releasing the inflation stems and nipples of the milker from the wedged position. Connector 62 may be adjusted to position the milker at the proper attitude so that the pull on the cow's teat is uniform.

The flow of milk from the inflations to the chamber 23a of the milker is sensed electrically at the lower end of the stem of each inflation, i.e., the end remote from the teat cup unit 25. At a point about two or three inches from the end of the inflation stem an opening 70 is formed in the wall of the stem and an electrode 71 extends therethrough. The electrode 71 is mounted on a band 72 which extends around approximately two-thirds of the periphery of the stem and is crimped so that the inflation stem assumes a channel shape (see FIGURE 6) rather than a cylindrical configuration, with the end 71a extending to a point adjacent the bottom of the channel 73. The inflation is mounted on the milker with the electrode 71 extending downwardly and the channel 73 at the bottom so that the milk will tend to flow through the channel and to fill it, even though there is only a relatively slight amount of milk flowing. A braided electrical connector 74 is attached to mounting band 72 and to the connector ring 65 adjacent the end of the inflation stem. A rubber sleeve 75 has one end 75a held under ring 65 and extends upwardly along the inflation stem overlying braided connector 74 and electrode mounting band 72. The rubber sleeve protects the electrical connection from damage or from accidental contact with the hooked portion 48 of the associated pulloff piston.

An essential requirement of commercial milking apparatus is that it be capable of easy and thorough cleaning so that all traces of milk may be washed from it without requiring excessive labor. The milk receiving chamber 23a illustrated in the drawing is designed for in-place cleaning in which a washing solution is circulated rapidly through the apparatus. The efficacy of this type of washing operation would be impaired if milk could lodge about the electrode 71 in such a manner that it could not easily be removed. The most critical consideration here is the surfaces between the wall of the inflation stem and the electrode. Any deformation of the inflation stem might tend to pull the material of the stem away from the electrode surface and allow milk to lodge between the parts. In order to reduce this tendency, the outer wall of the inflation is slit part-way through as indicated at 77, around the opening 70 through which the electrode extends. This permits the material in the wall of the stem to engage the surface of the electrode making a good seal regardless of the forces applied to the inflation stem.

Figure 15:
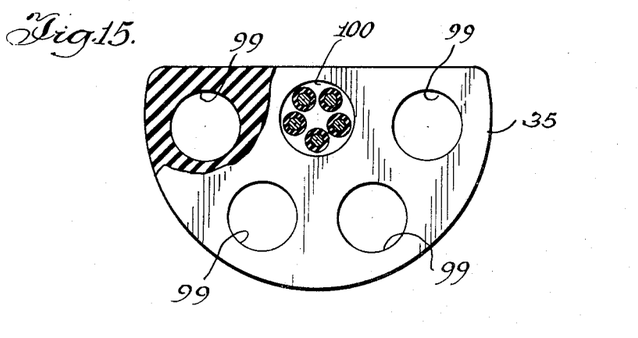
FIGURE 15 is a broken transverse view of the multiple passage vacuum holders interconnecting the control unit with the milker apparatus.

Control unit 33 includes four vacuum control valves 80, 81, 82 and 83, which control the actuation of the four pistons. The fifth vacuum control valve 84 forms a part of a pulsator control system and is not pertinent to the present discussion. The specific circuit for the system will be described below, but for the present it is sufficient to note that the valves 80 through 83 are electrically actuated and are under the control of relays 85, 86, 87 and 88. The valves are mounted on a base plate 90 which serves as a cover for a vacuum manifold 92 connected with vacuum supply hose 34. Valve 81 is representative and will be described in detail. The valve includes an outer casing 93 which contains an actuating coil 94 within which valve member 95 is movable. A passage 96 connects the valve with the vacuum manifold and is closed by valve member 95 when the valve is not energized. The valve is connected through passage 97, hose 98 and further passage means with one of the piston vacuum chambers. A plug 95a, above the valve member, has a vent passage 95b therethrough which admits air around valve 95 and through the passage means to the cylinder when the valve is closed. The vacuum connector hoses, as 98, from each of the valves, are connected, within the control unit, with the multiple passage hose 35 which extends between control unit 33 and milker 23. As shown in FIGURE 15, hose 35 has four vacuum passages 99 and a fifth passage 100 housing five wires which form a part of the electrical control circuit. At the milker, the vacuum passageways 99 are connected with the respective cylinders through tubes 50. Four of the electrical wires are connected with the conductive plates 64 which bear against the connector rings on the respective inflation stems while the fifth wire is connected with the metal cover 52, and thus with the supporting structure and the lid 39 of the milker, providing a common return path for the electrical control circuits.

Figure 16:
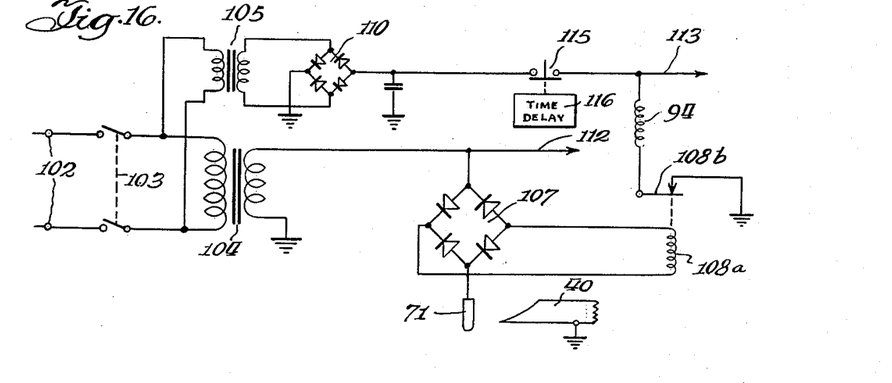
FIGURE 16 is a schematic diagram of the control circuit.

Turning now to FIGURE 16, the operation of the electrical control circuit will be described. The circuit is energized from a suitable source of power, as 117 volts A.C. connected with terminals 102 and through a power switch 103 to the primary windings of two stepdown transformers 104 and 105. The four sensing circuits, only one of which is shown in FIGURE 16, are connected with the secondary of transformer 104. A bridge rectifier network 107 is connected in series with milk flow sensing electrode 71. The sensing circuit is completed through the nipple 40 on the lid of the milker and the common return connection to the secondary of transformer 104. The actuating coil 108a of a relay is connected across the direct current output terminals of rectifier circuit 107 and has associated therewith a contact 108b which is closed when the relay is not energized. So long as milk is flowing through the inflation a circuit is completed between electrode 71 and nipple 40, and relay coil 108a is energized holding contact 108b, open.

Transformer 105 provides power for energizing a full wave bridge rectifier 110 from which the vacuum valves are operated. The coil 94 of valve 93 is connected with rectifier 110 through contact 108b. Thus, so long as milk flows and contact 108b is open, valve coil 94 is not energized. However, upon the cessation of the flow of milk, the sensing circuit is broken, relay 108 is deenergized and contact 108b closes completing the valve operating circuit. This connects the appropriate control cylinder with the source of vacuum through the passages described above. The sensing circuits for the three other teat cups are connected with line 112, while the vacuum valve operating coils are connected with line 113.

At the start of a milking operation there is no milk flowing, of course, and all of the vacuum valves are open, with the pistons drawn to their lowermost position. It is necessary, in order to attach the milker to the animal, to release the teat cup units. A start switch 115 connected with a suitable time delay mechanism 116, as an oil dashpot or the like is connected in series with line 113 from which the vacuum valves are energized. When the start button is depressed breaking this circuit, it remains open for a substantial period, as 45 to 60 seconds. This permits the operator to attach the teat cups to the animal and provides sufficient time for the milk to start flowing before switch 115 recloses. In the meantime, the control circuits are completed between the electrodes 71 and the nipples 40 and valve control switches 108b are opened.

In summary, so long as milk flows through the stem of the inflation, the control circuit is completed and the milking proceeds in the normal manner. As soon as the milk flow diminishes from any one quarter to the point where the electrical circuit is not completed between the sensing electrode and the nipple of that quarter, the appropriate vacuum valve is opened admitting vacuum, through a narrow bore metering passage to the lower chamber of the cylinder associated with the teat cup unit from which flow has diminished. The piston is drawn down slowly applying a pull to the teat cup. It often happens that this will cause a further milk flow from this quarter. When this happens the control circuit is again completed and the vacuum valve is energized. However, air is not freely admitted to the cylinder so that the downward pull is retained until the piston return spring forces the piston upwardly. If the milk flow does not restart, the downward pull of the teat cup unit continues until the unit is pulled off the animal.

While we have shown and described certain embodiments of our invention, it is to be understood that it is capable of many modifications. Changes, therefore, in the construction and arrangement may be made without departing from the spirit and scope of the invention as disclosed in the appended claims.

We claim:

1. In a milker: milk withdrawing means including a teat cup assembly connectable with an animal's teat, said means including a milk flow passage; means sensing a flow of milk through said passage; and means operably associated with said assembly and responsive to said sensing means, for applying a pull to said assembly when there is a predetermined flow condition of milk in said passage.

2. The milker of claim 1 wherein said last-mentioned means applies a pull which has a substantial downward component.

3. In a milker: milk withdrawing means including a teat cup assembly connectable with an animal's teat, said means including a milk flow passage; means sensing a flow of milk through said passage; and means operably associated with said assembly, responsive to said sensing means, for applying a gradually increasing downward pull to said assembly when there is a substantial cessation of milk flow in said passage.

4. In a milker: milk withdrawing means including a teat cup assembly connectable with an animal's teat, said means including a milk flow passage; means sensing a flow of milk through said passage; and teat cup pulling means operably associated with said assembly and responsive to said sensing means, for removing said assembly from said animal when there is a predetermined flow condition of milk in said passage.

5. In a milker: milk withdrawing means including a teat cup assembly connectable with an animal's teat, said means including a milk flow passage; means including an electrical circuit having a conductive element in said passage for sensing the flow of milk therethrough; and teat cup pulling means operably associated with said assembly and responsive to said sensing means, for removing said assembly from said animal when there is a predetermined flow condition of milk in said passage.

6. In a milker: milk withdrawing means including a teat cup assembly connectable with an animal's teat and having an inflation with a stem portion defining a milk flow passage and connected with an inlet nipple of a milk receiver; an electrical sensing circuit including an electrode carried in said stem and extending into said passage adjacent said nipple for sensing flow of milk through the passage, said electric circuit being completed through milk in said passage between said electrode and nipple; and teat cup pulling means operably associated with said teat cup assembly and responsive to said electric sensing circuit for removing said assembly from said animal upon substantial cessation of the flow of milk through the passage.

7. The milker of claim 6 wherein said electrode extends generally downwardly into the milk flow passage through the stem portion of said inflation, said passage having a narrow channel-like configuration adjacent said electrode.

8. In a milker: milk withdrawing means including a teat cup assembly connectable with an animal's teat, said means including a milk flow passage; means for sensing a flow condition of milk in said passage; means operably connected to said assembly for applying a pull thereto; and means responsive to said sensing means for actuating said pull applying means.

9. In a milker: milk withdrawing means including a teat cup assembly connectable with an animal's teat, said means including a milk flow passage; means for sensing a flow condition of milk in said passage; means including a piston and cylinder device for applying a pull to said assembly; and means responsive to said sensing means for actuating said pull applying means.

10. The milker of claim 9 wherein said piston and cylinder actuator includes a return spring operably associated with said piston.

11. In a milker: milk withdrawing means including a teat cup assembly connectable with an animal's teat, said means including a milk flow passage; means operably associated with said withdrawing means for sensing a flow condition of milk in said passage; means including a piston and cylinder device operably connected to said assembly for applying a pull thereto; a source of vacuum; valve means interconnecting said source of vacuum with said cylinder; and means connected with and responsive to said flow sensing means for actuating said valve to cause movement of said piston in said cylinder, applying a pull to said assembly.

12. The milker of claim 11 wherein said valve sensing means includes a switch which is actuated to open said valve means admitting vacuum to said cylinder upon substantial cessation of the flow of milk through said passage, causing movement of said piston to apply a pull to said assembly.

13. The milker of claim 12 wherein said vacuum source is connected with said cylinder through means defining a restricted vacuum passage.

14. In a milker: milk withdrawing means including a teat cup assembly connectable with an animal's teat and having an inflation with a stem portion defining a milk flow passage, connected with an inlet nipple of a milk receiver; means operably associated with said milk flow passage for sensing a flow condition of milk in said passage; means including a piston and cylinder device operably associated with said assembly for applying a pull thereto; means connected with an responsive to said sensing means and connected for actuating said pull applying means; and an extension on said piston having a hook portion in engagement with the stem of said inflation.

15. The milker of claim 14 wherein said hook portion is offset from the axis of said cylinder and is swivelable with respect to said cylinder.

16. In a milker: milk withdrawing means including a teat cup unit connectable with each of an animal's teats, each unit including a milk flow passage; means sensing flow of milk through each of said passages; and teat cup pulling means operably associated with each of said units and responsive to said sensing means, for removing each of said units from said animal when there is a predetermined flow condition of milk in the associated passage.

17. In a milker: milk withdrawing means including a teat cup assembly connectable with an animal's teats, said means including a milk flow passage; means defining a milk receiving chamber connected with the milk flow passage of said assembly; a cylinder block mounted on said chamber; a piston movable in said cylinder block and having a portion operably engaged with said teat cup assembly; means sensing a flow of milk through said passage; and means responsive to said sensing means for actuating said piston to apply a pull to said assembly.

18. In a milker: milk withdrawing means including a teat cup assembly connectable with an animal's teats, said means including milk flow passage; means defining a milk receiving chamber having a nipple extending therefrom, and to which said assembly is connected; a cylinder block removably carried on said chamber in a position generally below said nipple; a piston movable in said cylinder block and having a portion operably engaged with said teat cup assembly; means sensing flow of milk through said passage; and means responsive to said sensing means for actuating said piston to apply a pull to said assembly.

19. In a milker: milk withdrawing means including a plurality of teat cup units connectable with an animal's teats, each unit including a milk flow passage; means defining a milk receiving chamber having a plurality of nipples extending outwardly therefrom and to which the milk flow passages of said teat cup units are connected; means operably associated with each of said teat cup units for applying a downward pull thereto; a carrier for said means, mounted on said chamber; means sensing a flow of milk through each of said passages; and means responsive to said sensing means for selectively actuating said pull applying means.

20. In a milker: milk withdrawing means including a plurality of teat cup units connectable with an animal's teats, each unit including a milk flow passage; means defining a milk receiving chamber having a lid portion with a plurality of nipples extending outwardly therefrom, one connected with the milk flow passage of each of said teat cup units; means operably associated with each of said teat cup units for applying a downward pull thereto; a carrier for said pull applying means; a bearing surface on said chamber; a movable arm on said carrier having a surface cooperable with said bearing surface; an operator for said movable arm, having an overcentered locking position, holding said arm surface and bearing surface in operable relation; a further surface on said carrier wedged with said nipples; means sensing a flow of milk through each of said passages; and means responsive to said sensing means for selectively actuating said pull applying means.

21. The milker of claim 20 wherein said milk flow sensing means includes an electrical circuit for sensing the flow of milk through the stem of the inflation of each teat cup unit, the electrical circuit being connected with the milk receiving chamber nipple and including sensing means carried by the inflation with a connector portion on the inflation stem adjacent said nipple, said carrier having a connector in said control circuit and bearing against the connector portion on said inflation stem.

22. In a milker: milk withdrawing means including a teat cup assembly connectable with an animal's teats, said means including a milk flow passage; means for sensing a flow condition of milk in said passage; means including a piston and cylinder device operably connected for applying a pull to said assembly; a source of vacuum; a control unit remote from said milk withdrawing means, including a valve interconnecting said source of vacuum with said cylinder; and means responsive to said flow sensing means for actuating the valve in said control unit to cause movement of said piston in said cylinder, applying a pull to said assembly.

23. In a milker: milk withdrawing means including a teat cup assembly connectable with an animal's teat, said means including a milk flow passage; means for sensing a flow condition of milk in said passage; means including a piston and cylinder device operably connected for applying a pull to said assembly; a source of vacuum; two-position valve means selectively connecting said cylinder with air and with said source of vacuum; and means responsive to said flow sensing means for actuating said valve means, admitting vacuum to said cylinder to cause movement of said piston therein, applying a pull to said assembly.

24. In a milker: milk withdrawing means including a plurality of teat cup units connectable with an animal's teat, said means including a milk flow passage; means for sensing a flow condition of milk in said passage; means including a plurality of piston and cylinder devices operably connected for applying a pull to each of said units; a source of vacuum; control means remote from said milk withdrawing means and including a plurality of valves interconnecting said source of vacuum with each of said cylinders; means responsive to each of the flow sensing means for selectively actuating each of said valves to connect a cylinder with said source of vacuum, causing movement of the associated piston, applying a pull to each of said units.

25. The milker of claim 24 wherein said valves are connected with said cylinders through a single hose having multiple passages, and said flow sensing valve actuating means include an electrical control circuit having conductors forming a part thereof located in a passage through said hose.

26. In a milker: milk withdrawing means including a teat cup assembly connectable with an animal's teat, said means including a milk flow passage; means sensing a flow of milk through said passage; teat cup pulling means operably associated with said assembly and responsive to said sensing means, for removing said assembly from said animal when there is a predetermined flow condition of milk in said passage; and manually operable means for disabling said teat cup assembly removing means.

27. In a milker: milk withdrawing means including a teat cup assembly connectable with an animal's teat, said means including a milk flow passage; means including an electrical circuit having a conductive element in said passage for sensing the flow of milk therethrough; teat cup pulling means operably associated with said assembly and responsive to said sensing means, for removing said assembly from said animal when there is a predetermined flow condition of milk in said passage; and manually operable switch means in said electrical circuit for disabling said teat cup assembly removing means.

28. The milker of claim 27 wherein said manually operable switch has time delay means associated therewith.

References Cited in the file of this patent

UNITED STATES PATENTS

| | | |
|---|---|---|
| 908,449 | Daniels | Jan. 5, 1909 |
| 952,978 | Cramp | Mar. 22, 1910 |
| 2,102,275 | Martin | Dec. 14, 1937 |
| 2,321,616 | Perkins | June 15, 1943 |
| 2,576,808 | Perkins | Nov. 27, 1951 |
| 2,696,194 | Perkins | Dec. 7, 1954 |
| 2,898,549 | Miller | Aug. 4, 1959 |

FOREIGN PATENTS

| | | |
|---|---|---|
| 650,199 | Great Britain | Feb. 14, 1951 |